United States Patent
Shen et al.

(10) Patent No.: US 12,505,380 B2
(45) Date of Patent: Dec. 23, 2025

(54) SYSTEM, METHOD, AND STORAGE MEDIUM FOR DISTRIBUTED JOINT MANIFOLD LEARNING BASED HETEROGENEOUS SENSOR DATA FUSION

(71) Applicant: Intelligent Fusion Technology, Inc., Germantown, MD (US)

(72) Inventors: Dan Shen, Germantown, MD (US); Peter Zulch, Rome, NY (US); Marcello Disasio, Rome, NY (US); Erik Blasch, Arlington, VA (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 562 days.

(21) Appl. No.: 17/563,014

(22) Filed: Dec. 27, 2021

(65) Prior Publication Data

US 2022/0172122 A1  Jun. 2, 2022

Related U.S. Application Data

(63) Continuation-in-part of application No. 15/878,188, filed on Jan. 23, 2018, now Pat. No. 11,210,570.

(51) Int. Cl.
*G06N 20/00* (2019.01)
*G06F 18/25* (2023.01)
*H04N 23/20* (2023.01)

(52) U.S. Cl.
CPC ........... *G06N 20/00* (2019.01); *G06F 18/251* (2023.01); *H04N 23/20* (2023.01)

(58) Field of Classification Search
CPC .......... G06N 20/00; G06N 3/045; G06N 3/08; G06N 7/01; G06N 3/044; G06N 5/04
See application file for complete search history.

(56) References Cited

U.S. PATENT DOCUMENTS

| | | | |
|---|---|---|---|
| 2002/0112087 A1* | 8/2002 | Berg | H04L 69/165 |
| | | | 718/105 |
| 2010/0098306 A1 | 4/2010 | Madabhushi et al. | |
| 2013/0110323 A1 | 5/2013 | Knight | |

OTHER PUBLICATIONS

Ming Sun, Data Fusion via Manifold Matching, A dissertation submitted to The Johns Hopkins University in conformity with the requirements for the degree of Doctor of Philosophy. Baltimore, Maryland Oct. 2013 (Year: 2013).*

(Continued)

*Primary Examiner* — Clifford Hilaire
(74) *Attorney, Agent, or Firm* — ANOVA LAW GROUP, PLLC

(57) ABSTRACT

The present disclosure provide a system, a method, and a storage medium for distributed joint manifold learning (DJML) based heterogeneous sensor data fusion. The system includes a plurality of nodes; and each node includes at least one camera; one or more sensors; at least one memory configured to store program instructions; and at least one processor, when executing the program instructions, configured to obtain heterogeneous sensor data from the one or more sensors to form a joint manifold; determine one or more optimum manifold learning algorithms by evaluating a plurality of manifold learning algorithms based on the joint manifold; compute a contribution of the node based on the one or more optimum manifold learning algorithms; update a contribution table based on the contribution of the node and contributions received from one or more neighboring nodes; and broadcast the updated contribution table to the one or more neighboring nodes.

20 Claims, 9 Drawing Sheets

(56) References Cited

OTHER PUBLICATIONS

Ma L, Crawford MM, Tian J. Local manifold learning-based $ k $-nearest-neighbor for hyperspectral image classification. IEEE Transactions on Geoscience and Remote Sensing. Aug. 23, 2010;48(11):4099-109. (Year: 2010).*

Newman AJ, Mitzel GE. Upstream data fusion: History, technical overview, and applications to critical challenges. Johns Hopkins APL technical digest. Jan. 1, 2013;31(3):215-33. (Year: 2013).*

Shen D, Lu J, Zulch p. Disasio M, Chen G, Wang Z, Niu R. Joint manifold learning based distributed sensor fusion of image and radio-frequency data. In2019 IEEE Aerospace Conference Mar. 2, 2019 (pp. 1-9). IEEE. (Year: 2019).*

Alvissalim MS, Zaman B, Hafizh ZA, Ma'sum MA, Jati G, Jatmiko W, Mursanto P. Swarm quadrotor robots for telecommunication network coverage area expansion in disaster area. In2012 Proceedings of SICE Annual Conference (SICE) Aug. 20, 2012 (pp. 2256-2261). IEEE. (Year: 2012).*

Sawant A, Meshram B. Network programing in Java using Socket. Google Scholar. Jan. 2013. (Year: 2013).*

Davenport MA, Hegde C, Duarte MF, Baraniuk RG. Joint manifolds for data fusion. IEEE Transactions on Image Processing. Jun. 14, 2010; 19(10): 2580-94. (Year: 2010).

Wang, C. and Mahadevan, S., Jul. 2011. Heterogeneous domain adaptation using manifold alignment. In IJCAI proceedings-international joint conference on artificial intelligence, vol. 22, No. 1, p. 1541. (Year: 2011).

Escher, Christine M., and Pongdate Montagantirud. "Classifying seven dimensional manifolds of fixed cohomology type." Differential Geometry and its Applications 49(2016):312-325. (Year:2016).

* cited by examiner

SYSTEM, METHOD, AND STORAGE MEDIUM FOR DISTRIBUTED JOINT MANIFOLD LEARNING BASED HETEROGENEOUS SENSOR DATA FUSION

CROSS-REFERENCES TO RELATED APPLICATIONS

This application is a continuation-in-part of U.S. patent application Ser. No. 15/878,188, filed on Jan. 23, 2018, the entire content of which is incorporated herein by reference.

GOVERNMENT RIGHTS

The present disclosure was made with Government support under Contract No. FA8750-17-C-0298, awarded by the United States Air Force Research Laboratory. The U.S. Government has certain rights in the present disclosure.

FIELD OF THE DISCLOSURE

The present disclosure generally relates to the field of information processing technology and, more particularly, relates to a system, a method, and a storage medium for distributed joint manifold learning based heterogeneous sensor data fusion.

BACKGROUND

In various site-monitoring scenarios using multi-sensor modalities, the data streams not only have a high dimensionality, but also belong to different phenomenon. For example, a moving vehicle may have an emitter that transmits radio-frequency (RF) signals, an exhaust system sending acoustic signals, and structure seen in the visual spectrum, all of which may be collected by passive RF sensors, acoustic sensors, and video cameras, respectively. These cases demonstrate that a moving object is observed by different modalities (data streams collected by passive RF sensors, acoustic sensors, and cameras) could benefit from sensor fusion to increase the tracking accuracy.

Sensor fusion includes low-level information fusion (LLIF) in which raw data is processed upstream near the sensors for object and situation assessments such as extraction of color features from pixel imagery. High-Level Information Fusion (HLIF) includes downstream methods in which context is used for sensor, user, and mission refinement. Machine analytics exploitation of sensor data and game theoretic algorithms can support operational relevant scenarios in which users don't have the time to examine all data feeds and perform real-time sensor management and decision analysis.

Sensor fusion is typically performed by combining outputs (decisions) of several signature modalities through decision-level fusion. While decision fusion improves the performance by incorporating scores from different modalities, it requires the consideration of the correlation/dependence between data of different modalities. All data in the measurement domain factually reflects same objects of interest, which indicates that the measurements of different modalities have strong mutual information between them. The transformation from sensor data to a decision introduces information loss, while feature information such as track pose retains salient information. How to efficiently fuse all data of different modalities in the measurement domain with a tolerable cost is investigated in through a centralized fusion framework using a joint manifold learning (JML) algorithm. Joint manifold learning (JML) for real-time upstream data fusion requires high-dimensional data analysis and intelligent hardware implementation. The JML framework is adapted to handle raw sensor data, develop distributed paradigm, and verify on instrumentation.

There is an increasing demand for unmanned systems to perform a wide range of intelligence, surveillance and reconnaissance (ISR) missions. The demand for small unmanned air systems (SUAS) results from reducing costs, increasing use for stand-off monitoring, and replacing piloted aircraft in disaster responses. With reduced size come more restrictive payload weights, limiting the number and diversity of sensors that can be located on a single platform. As a result, platforms must coordinate to share and leverage multi-sensor data over limited communications channels.

BRIEF SUMMARY OF THE DISCLOSURE

One aspect or embodiment of the present disclosure provides a system for distributed joint manifold learning based heterogeneous sensor data fusion. The system includes a plurality of nodes and each node includes at least one camera; one or more sensors; at least one memory, configured to store program instructions; and at least one processor, coupled with the at least one memory and, when executing the program instructions, configured to obtain heterogeneous sensor data from the one or more sensors to form a joint manifold; determine one or more optimum manifold learning algorithms by evaluating a plurality of manifold learning algorithms based on the joint manifold; compute a contribution of the node based on the one or more optimum manifold learning algorithms; update a contribution table based on the contribution of the node and contributions received from one or more neighboring nodes; and broadcast the updated contribution table to the one or more neighboring nodes.

Another aspect or embodiment of the present disclosure provides a method for distributed joint manifold learning based heterogeneous sensor data fusion, performed by a node in a system, each node comprising at least one camera, one or more sensors, and at least one processor. The method includes obtaining heterogeneous sensor data from the one or more sensors to form a joint manifold; determining one or more optimum manifold learning algorithms by evaluating a plurality of manifold learning algorithms based on the joint manifold; computing a contribution of the node based on the one or more optimum manifold learning algorithms; updating a contribution table based on the contribution of the node and contributions received from one or more neighboring nodes; and broadcasting the updated contribution table to the one or more neighboring nodes.

Another aspect or embodiment of the present disclosure provides a non-transitory computer-readable storage medium, containing program instructions for, when being executed by a processor, performing a method for distributed joint manifold learning based heterogeneous sensor data fusion. The method includes obtaining heterogeneous sensor data from the one or more sensors to form a joint manifold; determining one or more optimum manifold learning algorithms by evaluating a plurality of manifold learning algorithms based on the joint manifold; computing a contribution of the node based on the one or more optimum manifold learning algorithms; updating a contribution table based on the contribution of the node and contributions received from one or more neighboring nodes; and broadcasting the updated contribution table to the one or more neighboring nodes.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

References may be made in detail to exemplary embodiments of the disclosure, which may be illustrated in the accompanying drawings. Wherever possible, same reference numbers may be used throughout the accompanying drawings to refer to same or similar parts.

Figure 1:
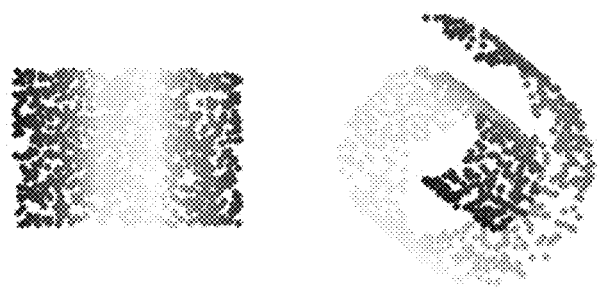
FIG. 1 depicts an exemplary 2-D manifold embedded in a 3-D apace.
Figure 2:
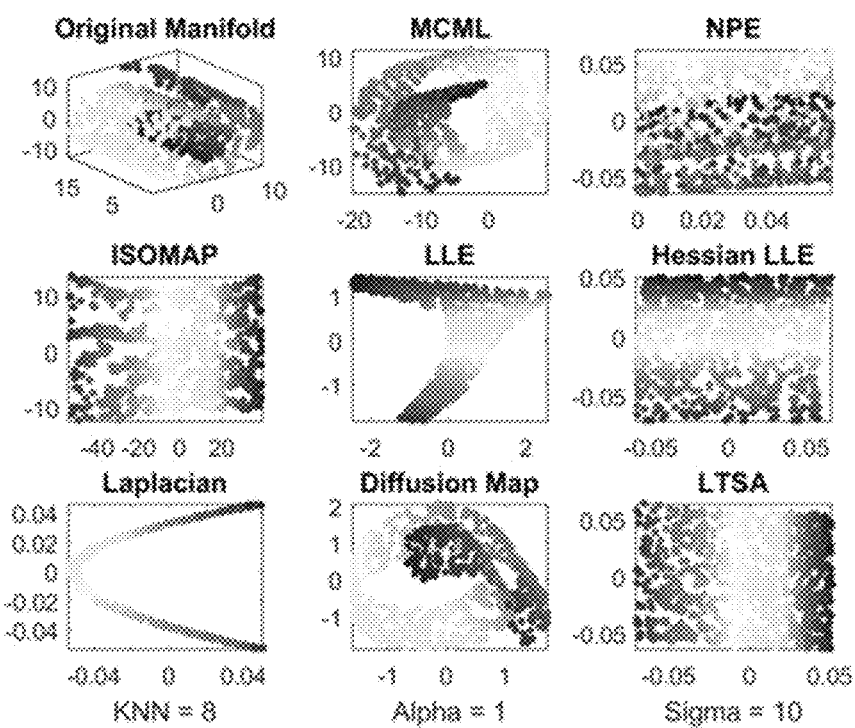
FIG. 2 depicts exemplary dimensionality reduction of a 3D Swiss roll based on nonlinear manifold learning algorithms.

Manifold learning is an algorithm to non-linear dimensionality reduction. Algorithms for such task are based on that dimensionality of various datasets is only artificially high. FIG. 1 depicts an exemplary 2-D manifold embedded in a 3-D apace, where a 3D Swiss roll is on the right, and the associated 2D manifold is on the left. FIG. 2 depicts dimensionality reduction of a 3D Swiss roll based on nonlinear manifold learning algorithms. FIG. 2 illustrates applications of manifold learning algorithms in dimensional reduction of the 3D Swiss Roll, which has the 2D embedded manifold (shown in FIG. 1). The plots shown in FIG. 2 provide comparison of eight manifold learning algorithms.

Joint manifolds for heterogeneous sensor data are described in detail hereinafter. For heterogeneous multiple-sensor data fusion, each sensor modality (k) forms a manifold, which is defined as:

$$\mathcal{M}_k = \{p_k = f_k(\theta) : \theta \in \Theta\} \qquad (1)$$

where $\theta$ is a parameter space; a parameter $\theta$ is an intrinsic variable or variable set in observed phenomena $f_k(\theta)$, which changes as a continuous function of the parameter $\theta$.

For a total of K sensors, there are K manifolds. A product manifold is defined as:

$$\mathcal{M} = \mathcal{M}_1 \times \mathcal{M}_2 \times \ldots \times \mathcal{M}_K \qquad (2)$$

Then, a K-tuple point is defined as:

$$p = p_1 \times p_2 \times \ldots \times p_K \qquad (3)$$

Accordingly, a joint manifold is defined as:

$$\mathcal{M}^* = \{p \in \mathcal{M} : p_j = \psi_j(p_1), j \in [2, 3, \ldots, K]\} \qquad (4)$$

The definition requires a base manifold, to which all other manifolds can be constructed using mapping $\psi_k$. The base manifold may be any manifold; and without loss of generality, the first manifold may be set as the base manifold.

Figure 3:
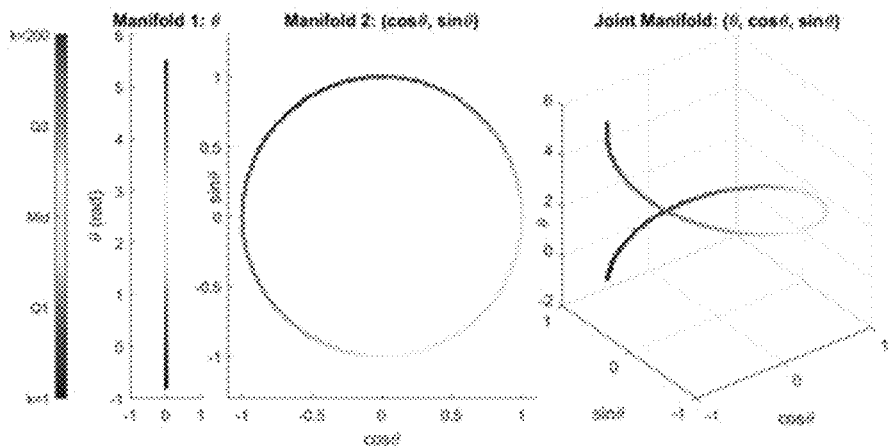
FIG. 3 depicts an exemplary helix joint manifold.

FIG. 3 depicts an exemplary helix joint manifold. The base manifold is an angle $\theta \in [-\pi/4, 7\pi/4)$. The manifold (x,y) is the position of a point moving along a circle with a fixed radius of one meter and an angle specified by $\theta$. Then, the joint manifold of a helix ($\theta$, cos $\theta$, sin $\theta$) is shown on the right, as shown in FIG. 3.

Figure 4:
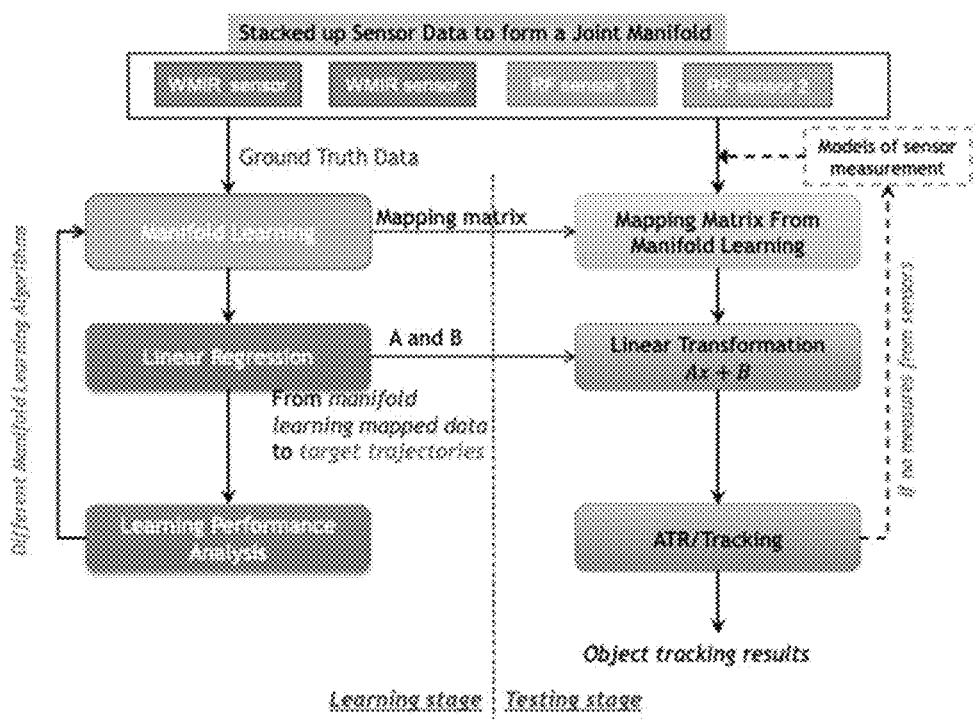
FIG. 4 depicts an exemplary block diagram of a centralized joint manifold learning framework (JMLF)

A joint manifold learning framework (JMLF) is described in detail hereinafter. FIG. 4 depicts an exemplary block diagram of a centralized JMLF. The joint manifolds may be formed by stacking up all sensor data. Then, in a learning or training stage, the ground truth data may be used to train the JMLF by evaluating and selecting manifold learning algorithms. Since the goal is to determine object tracks, raw manifold learning results (i.e., dimension reduction results) may be mapped to object trajectories via linear regression. The reason for selecting the linear regression mapping is described as follows. Intrinsic low dimensional data (2D for each vehicle), extracted by manifold learning algorithms from high dimensional data, may be the linear transformation (i.e., rotation and shift) of vehicle positions and velocities. The nonlinearities of the sensor data, for example, Doppler data in DIRSIG (digital imaging and remote sensing image generation) datasets, may be handled by manifold learning algorithms. The JMLF may be for centralized sensor fusion, which requires that each sensor transmits preprocessed results to a fusion center where these sensor data results are stacked up and fed into a JML engine for sensor fusion (intrinsic low dimensional data).

A distributed joint manifold learning framework (DJMLF) is described in detail hereinafter. For a swarm of heterogeneous sensors, a distributed paradigm based on diffusion is desired. As shown in FIG. 4, the fusion process is mathematically simple. $Y=(x \cdot M_{manifold})A_{LR}+B_{LR}$, where $A_{LR}$ and $B_{LR}$ denote linear regression mapping from manifold learning results to the states of interests, x denotes stacked sensor data, and $M_{manifold}$ denotes manifold learning mapping. Different manifold learning algorithms may have different $M_{manifold}$ matrices. The $A_{LR}$, $B_{LR}$, and $M_{Manifold}$ matrices may be specified offline in the training stage. A centralized mechanism may require a central node to collect all sensor data and forms x which is a row vector for a single sample. For example, in a DIRSIG dataset 1 (1 vehicle), x at time k is $x_k=(x_k^{MWIR1}, x_k^{MWIR2}, x_k^{RF1}, x_k^{RF2}, x_k^{RF3})$, where each element is a scalar ($x_k^{MWIR1}, x_k^{MWIR2}$) are two-dimensional data from a midwave infrared (MWIR) sensor, while ($x_k^{RF1}, x_k^{RF2}, x_k^{RF3}$) are measurements from radio frequency (RF) sensors 1, 2, and 3, respectively.

After the training stage, using, for example, neighborhood preserving embedding (NPE) algorithm, the joint manifold learning results are defined as:

$$y_k = (x_k \times M_{NPE}) \times a_{LR} + b_{LR} \quad (5)$$

Taking the DIRSIG Sim1 dataset as an example, $x_k$ is the stacked sensor inputs (1×5 vector: columns 1-2 for nadir MWIR, column 3 for north RF sensor, column 4 for west RF sensor, and column 5 for nadir RF sensor) and these inputs may be the preprocessed results. $M_{NPE}$ (5×2 matrix), $a_{LR}$ (2×2 matrix), and $b_{LR}$ (1×2 matrix), which are the training results and fixed for the application stage, are:

$$M_{NPE} = \begin{bmatrix} 1.3168 \times 10^{-6} & 0.0020 \\ 1.8173 \times 10^{-5} & -3.8449 \times 10^{-4} \\ -7.0854 \times 10^{-7} & 2.2747 \times 10^{-4} \\ -1.0936 \times 10^{-6} & 8.3576 \times 10^{-5} \\ 5.6274 \times 10^{-7} & 0.0027 \end{bmatrix} \quad (6)$$

$$a_{LR} = \begin{bmatrix} 1.0355 \times 10^4 & 5.4295 \times 10^4 \\ 416.4122 & -20.1946 \end{bmatrix} \quad (7)$$

$$b_{LR} = [-0.0115 \quad 0.0012] \quad (8)$$

The values of equations (6)-(8) may determine the contribution of each sensor. For MWIR, the contribution at time k is:

$$C_k^{MWIR} = x_k^{MWIR} \begin{bmatrix} 0.8499 & 0.0309 \\ 0.0281 & 0.9945 \end{bmatrix},$$

where $x_k^{MWIR}$ is a 1×2 vector of MWIR's input at time k. Similarly, $C_k^{N-RF}[0.0874-0.0431]$, where $x_k^{N-RF}$ is a scalar (Doppler shift) of North RF sensor's input at time k. $k_k^{W-RF}=x_k^{W-RF}[0.0235-0.0611]$, where $x_k^{N-RF}$ is a scalar (Doppler shift) of West RF sensor's input at time k. $C_k^{NADIR\,RF}=x_k^{NADIR\,RF}[1.1480-0.0248]$, where $x_k^{NADIR\,RF}$ is a scalar (Doppler shift) of nadir RF sensor's input at time k.

Then, in the DJMLF algorithm, each node can compute its own contribution by adding all the contributions of its local sensors. In the diffusion paradigm, each node may also update the contribution table based on not only its own contribution but also the received contributions from other nodes. The contribution table may include the involvement of each sensor and the time stamp. Each node may broadcast the updated contribution table to its neighbors.

Various embodiments of the present disclosure provide a system, a method, and a storage medium for DJML based heterogeneous sensor data fusion. A system for DJML based heterogeneous sensor data fusion is described in detail hereinafter. The system may include a plurality of nodes and each node includes at least one camera; one or more sensors; at least one memory, configured to store program instructions; and at least one processor, coupled with the at least one memory and, when executing the program instructions, configured to obtain heterogeneous sensor data from the one or more sensors to form a joint manifold; determine one or more optimum manifold learning algorithms by evaluating a plurality of manifold learning algorithms based on the joint manifold; compute a contribution of the node based on the one or more optimum manifold learning algorithms; update a contribution table based on the contribution of the node and contributions received from one or more neighboring nodes; and broadcast the updated contribution table to the one or more neighboring nodes.

In one embodiment, the system may further include a ground station, where a node of the plurality of nodes includes an unmanned aerial vehicle (UAV) or drone.

In one embodiment, the at least one camera may include one or more infrared (IR) cameras; and the one or more sensors may include one or more of an image sensor, an IR sensor, and a radio frequency (Doppler) sensor.

In one embodiment, the image sensor may be configured to process local camera information of the node to estimate state information of the node.

In one embodiment, the system may further include communication links among the ground station and the plurality of nodes where the communication links are established using sockets.

In one embodiment, a pre-defined synchronization time may be transmitted to the plurality of nodes.

In one embodiment, the one or more optimum manifold learning algorithms may be determined by performing the plurality of manifold learning algorithms to process the joint manifold to generate raw manifold learning results; processing the raw manifold learning results to generate intrinsic parameters; and determining the one or more optimum manifold learning algorithms by evaluating the plurality of manifold learning algorithms based on the raw manifold learning results and the intrinsic parameters.

Figure 5:
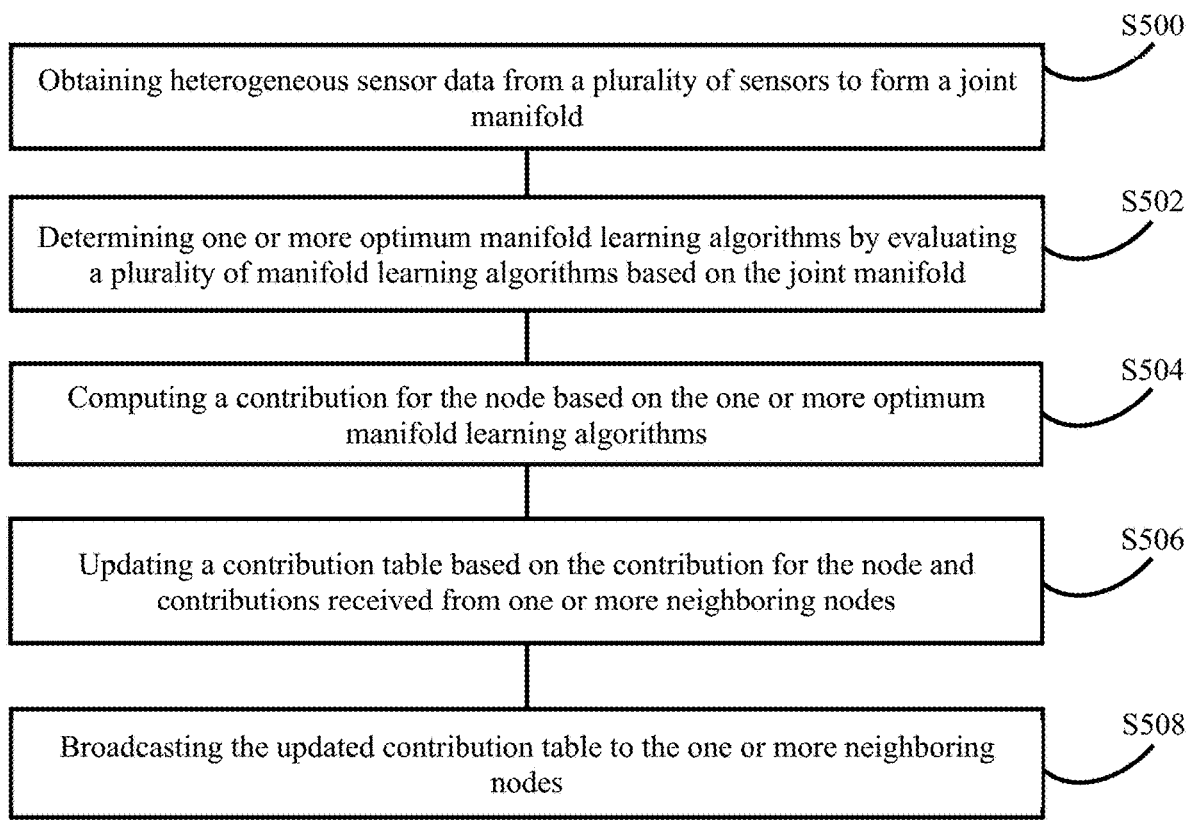
FIG. 5 depicts a flowchart of a method for distributed joint manifold learning based heterogeneous sensor data fusion according to various disclosed embodiments of the present disclosure.

FIG. 5 depicts a flowchart of the method for DJML based heterogeneous sensor data fusion according to various disclosed embodiments of the present disclosure. According to various embodiments of the present disclosure, the method for DJML based heterogeneous sensor data fusion may include the following steps.

In S500, heterogeneous sensor data is obtained from one or more sensors to form a joint manifold. In one embodiment, the heterogeneous sensor data may be obtained from one or more sensors of one node. In another embodiment, the heterogeneous sensor data may be obtained from one or more sensors of a plurality of nodes, which may not be limited according to various embodiments of the present disclosure. In S502, one or more optimum manifold learning algorithms are determined by evaluating a plurality of manifold learning algorithms based on the joint manifold. In S504, a contribution for the node is computed based on the one or more optimum manifold learning algorithms. In S506, a contribution table is updated based on the contribution for the node and contributions received from one or more neighboring nodes. In S508, the updated contribution table is broadcasted to the one or more neighboring nodes.

The hardware implementation for DJML based heterogeneous sensor data fusion is described according to various embodiments of the present disclosure hereinafter.

Figure 6:
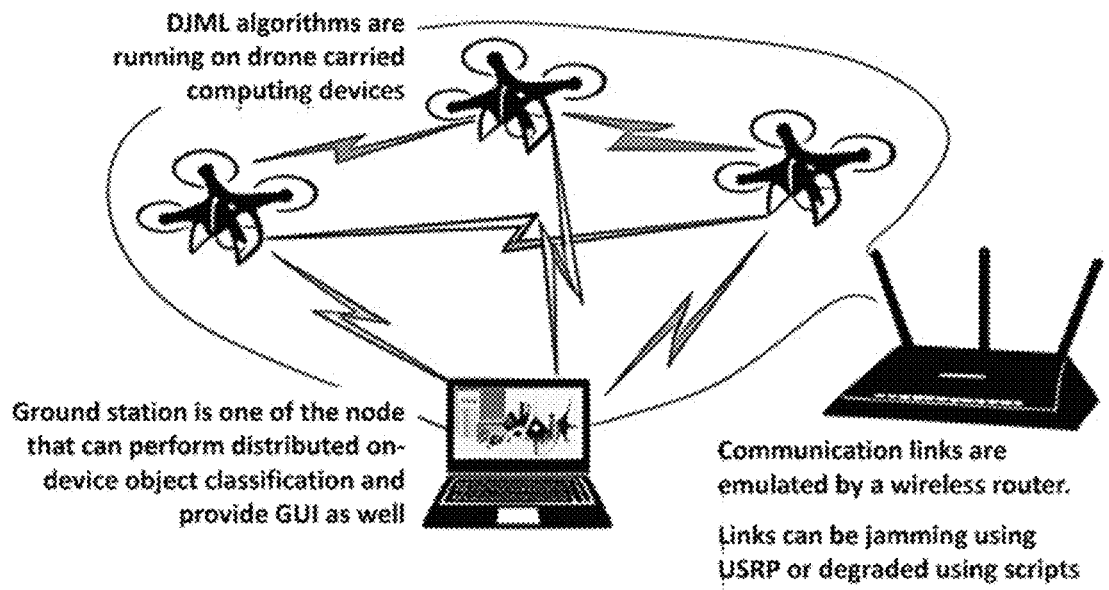
FIG. 6 depicts an exemplary system for distributed joint manifold learning based heterogeneous sensor data fusion according to various disclosed embodiments of the present disclosure.

FIG. 6 depicts an exemplary system for distributed joint manifold learning based heterogeneous sensor data fusion according to various disclosed embodiments of the present disclosure. The overall view of the hardware testbed is shown in FIG. 6, where distributed JML algorithms operate on drones, which can share data using a wireless router. A ground station is a special node and run both DJML algorithm and graphical user interface (GUI).

Figure 7:
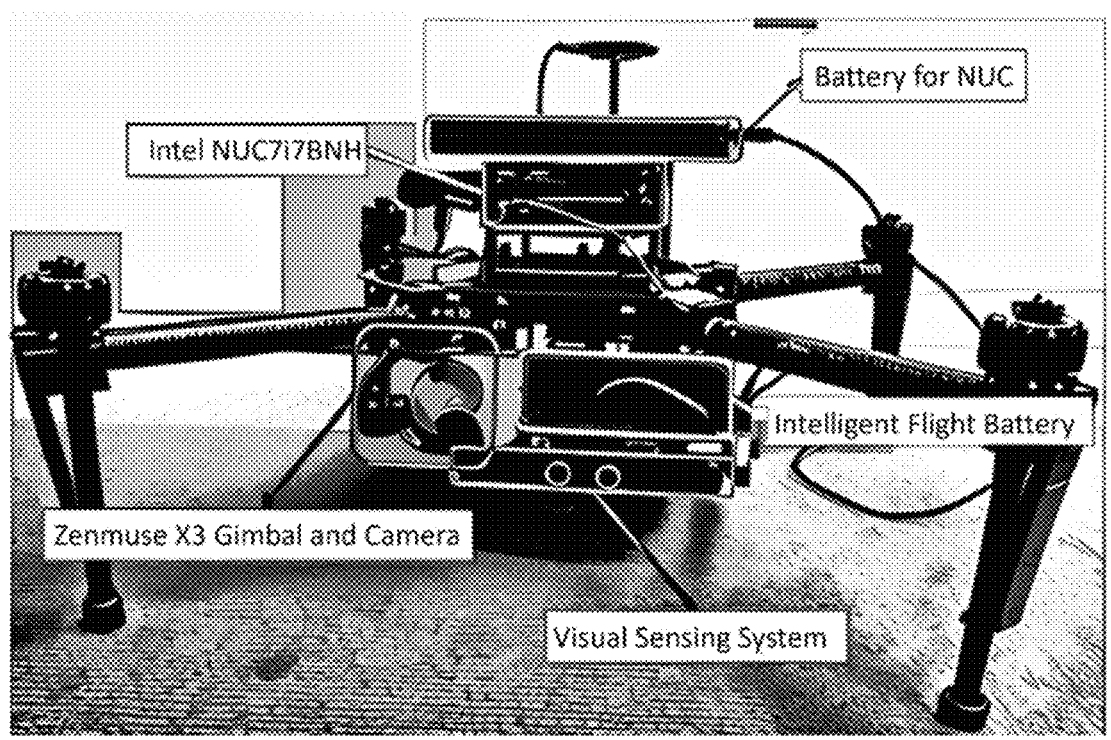
FIG. 7 depicts an exemplary heterogeneous data fusion node according to various disclosed embodiments of the present disclosure.

According to various embodiments of the present disclosure, platform setup for DJML is described in detail herein. The moving platform is designed as a drone, or any other suitable vehicle, which may not be limited in various embodiments of the present disclosure. FIG. 7 depicts an exemplary heterogeneous data fusion node according to various disclosed embodiments of the present disclosure. Referring to FIG. 7, Intel NUC7i7BNH is used to process the sensory raw data and exchange the data with other distributed nodes. The Zenmuse X3 Gimbal and visual sensing system is used to extract the imagery data and enhances unmanned aerial vehicle (UAV or drone) control. There are two batteries in the designed system, the battery on the top is used to supply the power for the Intel NUC7i7BNH and the battery in the middle named intelligent flight battery supplies the power for the drone.

Figure 8:
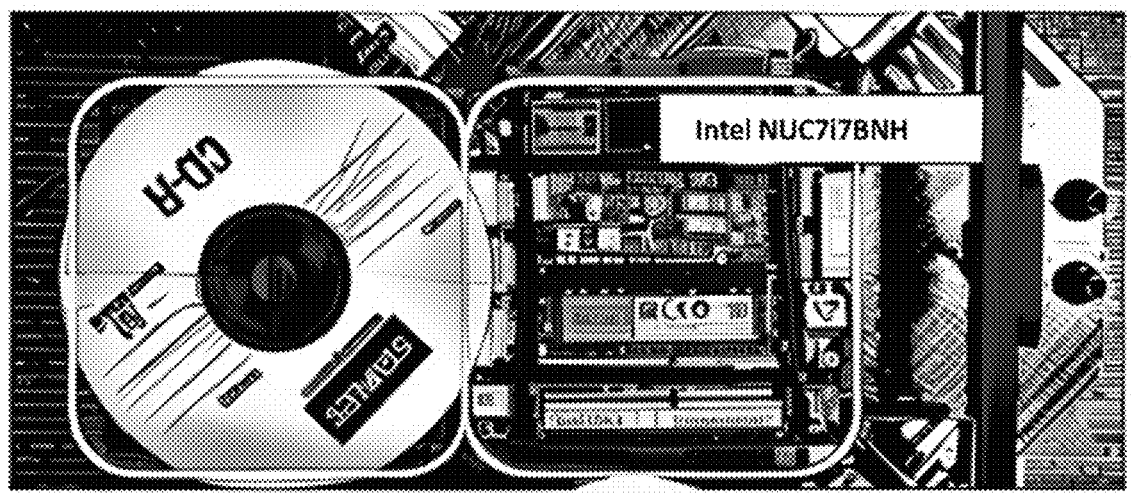
FIG. 8 depicts Intel NUC7i7BNH installation according to various disclosed embodiments of the present disclosure.

Considering the maximum takeoff size, weight, and performance requirements, the Intel NUC7i7BNH meets the objectives, which is built with a dual-core 7th generation Intel Core i7 processor and has Intel Turbo Boost Technology 2.0 for unprecedented power and responsiveness. The dimensions of the Intel NUC7i7BNH is around 4"×4"×1". It can perfectly fit in the expansion bay kit as shown in FIG. 8. FIG. 8 depicts Intel NUC7i7BNH installation according to various disclosed embodiments of the present disclosure. The Intel NUC7i7BNH is slightly smaller than the normal compact disc (CD).

Figure 9:
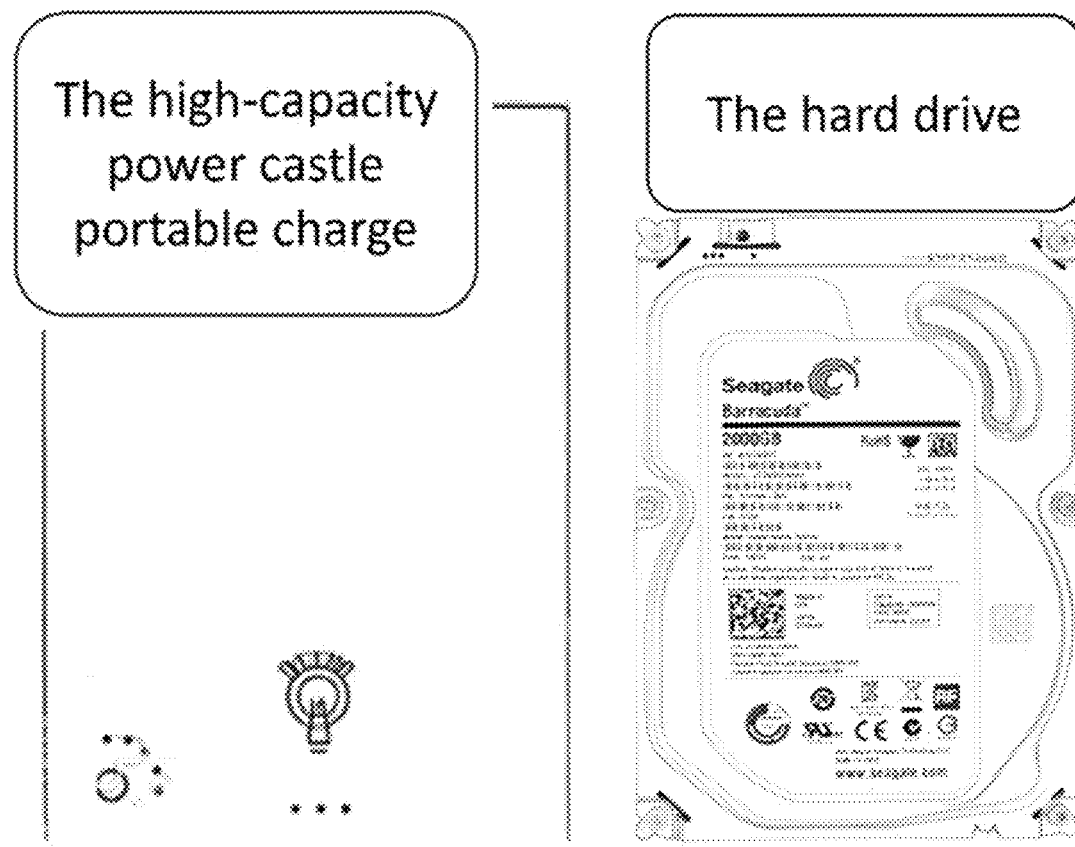
FIG. 9 depicts a high capacity power charger according to various disclosed embodiments of the present disclosure.

To sufficiently provide the power for the processor (the Intel NUC7i7BNH), the Intocircuit 26000 mAh high capacity power castle portable charger is utilized with a size of 7.3"×0.8"×4.9". FIG. 9 depicts a high capacity power charger according to various disclosed embodiments of the present disclosure. FIG. 9 shows the battery size for better visualization comparing to normal hard drive. The battery can supply power of four options—5V/2.1 A, 12V/4 A, 16V/3.5 A, and 19V/3 A, or any other suitable power according to various embodiments of the present disclosure.

Figure 10:
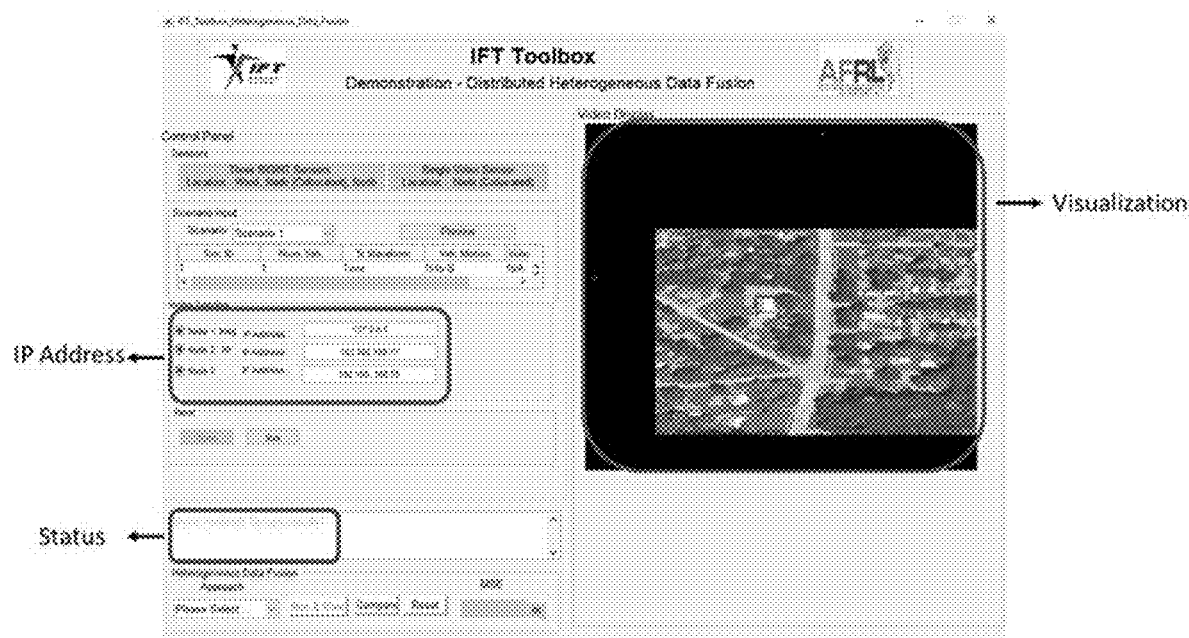
FIG. 10 depicts time synchronization for nodes according to various disclosed embodiments of the present disclosure.

For the time synchronization, during the initialization process, the control center may send the start time information to all the nodes, and all the processing nodes may start to conduct the heterogeneous data fusion at the pre-set time. It should be noted that all processing nodes may have a same local time. FIG. 10 depicts time synchronization for nodes according to various disclosed embodiments of the present disclosure. As shown in FIG. 10, the operator type into each processing node's IP address, by clicking Button Sync, the connection between the control center and each processing node is established. After clicking Button Run, all the processing nodes may start to conduct the data processing at the given time.

Figure 11:
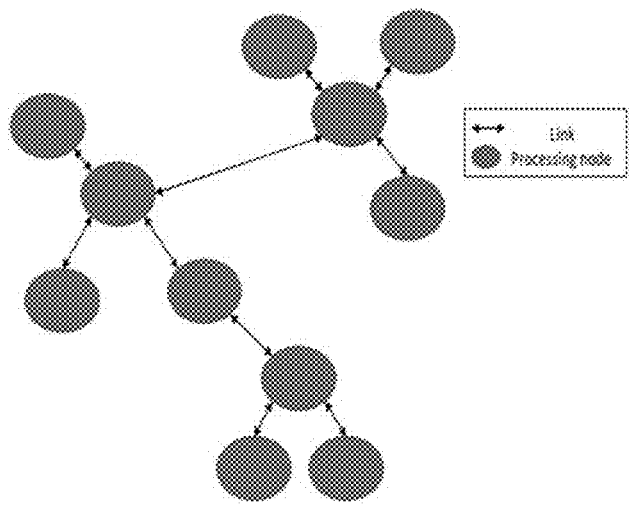
FIG. 11 depicts a distributed topology of nodes according to various disclosed embodiments of the present disclosure.

According to various embodiments of the present disclosure, data exchange is described in detail herein. FIG. 11 depicts a distributed topology of nodes (e.g., airborne platforms) according to various disclosed embodiments of the present disclosure. Each processing node can exchange information between the processing nodes in the neighborhood. Each processing node operates with local measurements then shares the results with limited number of neighbors within the communication range. For example, the processing node with image sensor can process the local camera information to estimate the vehicle state information, and the updated fusion information may then be broadcasted to the processing node with RF and image sensors in the neighborhood. Each processing node conducts the process in the same manner, significantly reducing the computing burden for each processing node and avoids the centralized processing mechanism.

Figure 12:
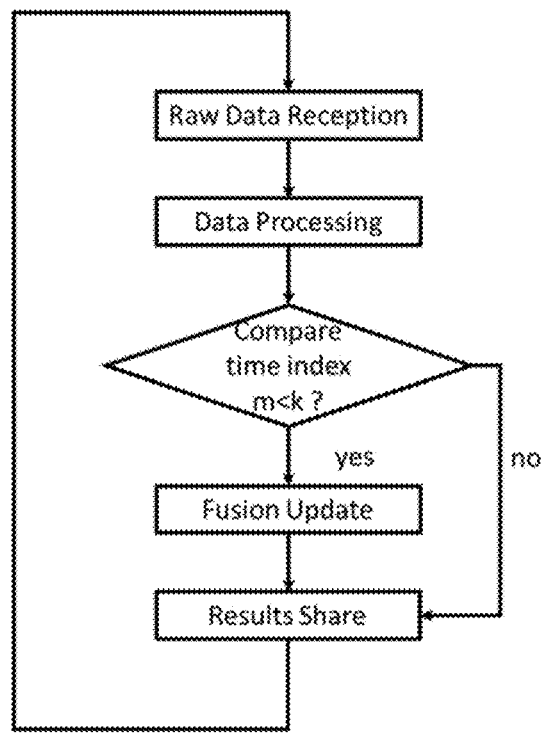
FIG. 12 depicts a data process flowchart for each processing node according to various disclosed embodiments of the present disclosure.

Given the DJML algorithm the data structure of the shared information is $z=(y, m, s_1, s_2, s_3)$, where y is the current fused results, m denotes the time index at which sensor MWIR is latest updated, and s1, s2, and s3 are the time index RF sensor 1, 2, and 3 of the latest update, respectively. FIG. 12 depicts a data process flowchart for each processing node according to various disclosed embodiments of the present disclosure. For each processing node, the data processing flow chart for Sensor MWIR can be seen in FIG. 12. Upon received raw data from the sensor reading, the raw data is immediately processed. Based on the received data which includes the time index at which the fused information is last updated, the fused data is updated before sending out to the processing node's neighbor. The advantage of the distributed implementation is that all the information is processed in a diffusion fashion and fused through communication established among the processing nodes.

Figure 13:
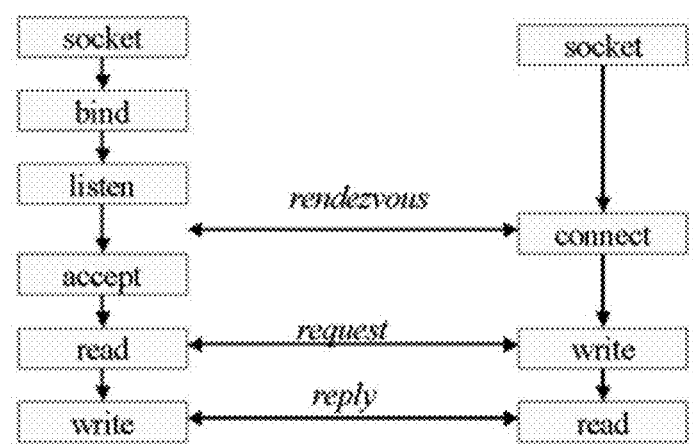
FIG. 13 depicts connection-oriented socket communication according to various disclosed embodiments of the present disclosure.

According to various embodiments of the present disclosure, socket programming is described in detail herein. In the hardware implementation, the links between the processing nodes are built based on the sockets. Sockets provide the communication mechanism between two processing nodes using a transmission control protocol (TCP). A client (processing node) program creates a socket on its end of the communication and attempts to connect that socket to a server (another processing node) as shown in FIG. 13. FIG. 13 depicts connection-oriented socket communication according to various disclosed embodiments of the present disclosure. When the connection is made, the server creates a socket object on its end of the communication. The client and the server can now communicate by writing to and reading from the socket. The following steps occur when establishing a TCP connection between two processing nodes using sockets. The processing node which receives data instantiates a TCPIP object and denotes a port number. The processing node invokes a method to wait until a client connects to the server on the given port. A client instantiates a TCPIP object, specifying the server name and the port number to connect to. Once the connection is established, the processing node may send and receive the information by using the function fread (object, # of data, 'datatype') and fwrite(object, data, 'datatype').

Figure 14:
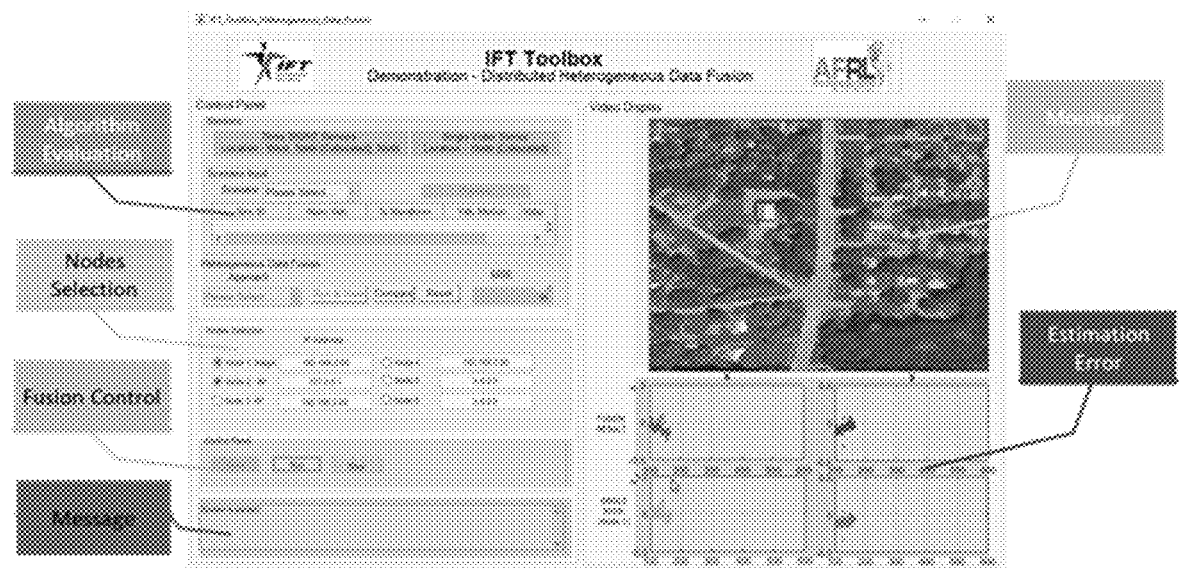
FIG. 14 depicts a developed graphical user interface (GUI) for fusion control and monitoring according to various disclosed embodiments of the present disclosure.

According to various embodiments of the present disclosure, user interface is described in detail herein. The developed graphical user interface (GUI) serves as the control center in the experiment. FIG. 14 depicts a developed graphical user interface (GUI) for fusion control and monitoring according to various disclosed embodiments of the present disclosure. To begin, the operator can select the processing nodes based on the specific situational requirement as shown covered by the yellow box in FIG. 14, then by clicking the Button Sync, the control center may create the connection with the selected processing nodes. If the connection is successfully created, the message box may show "Synchronized Successfully!". After a user clicks "Run" button, the control center sends the pre-defined time at which all the processing nodes start to conduct the raw data processing. At the same time, the fused target estimation results may be sent by the processing nodes and shown in the monitor (the green box in FIG. 14). The estimation error is calculated in the real time. For the debugging purpose, the overall fused estimation error and the remote platform estimation error are displayed in the designed control center.

Also, the operator can stop the data fusion process any time by clicking "Stop" button or restart the fusing process by clicking "Run" button. At each processing period (0.1 s), the processor carried by the drone may read one frame of video data and the corresponding RF signal, and conduct the local processing to achieve the vehicle position estimation. Then the processing node may check the latest updated estimation information sent from its neighborhood and update the current vehicle position estimation. The latest updated estimation is sent to all the processing nodes in the neighborhood.

Figure 15:
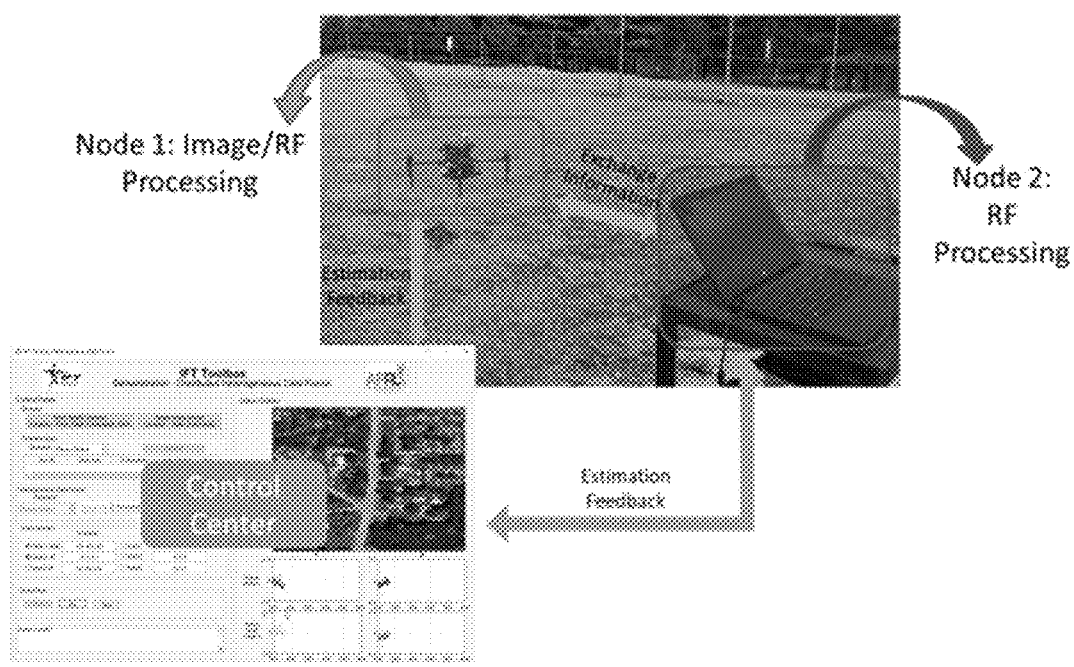
FIG. 15 depicts a field test setup according to various disclosed embodiments of the present disclosure.

To demonstrate the performance of the distributed JML, field tests as shown in FIG. 15 is conducted. FIG. 15 depicts a field test setup according to various disclosed embodiments of the present disclosure. It is assumed that the current communication is in not perfect and has data delays and dropouts. During some period, the communication link between the ground station and the remote moving platform may break. At other times, the processing nodes can perfectly exchange the information.

Figure 16:
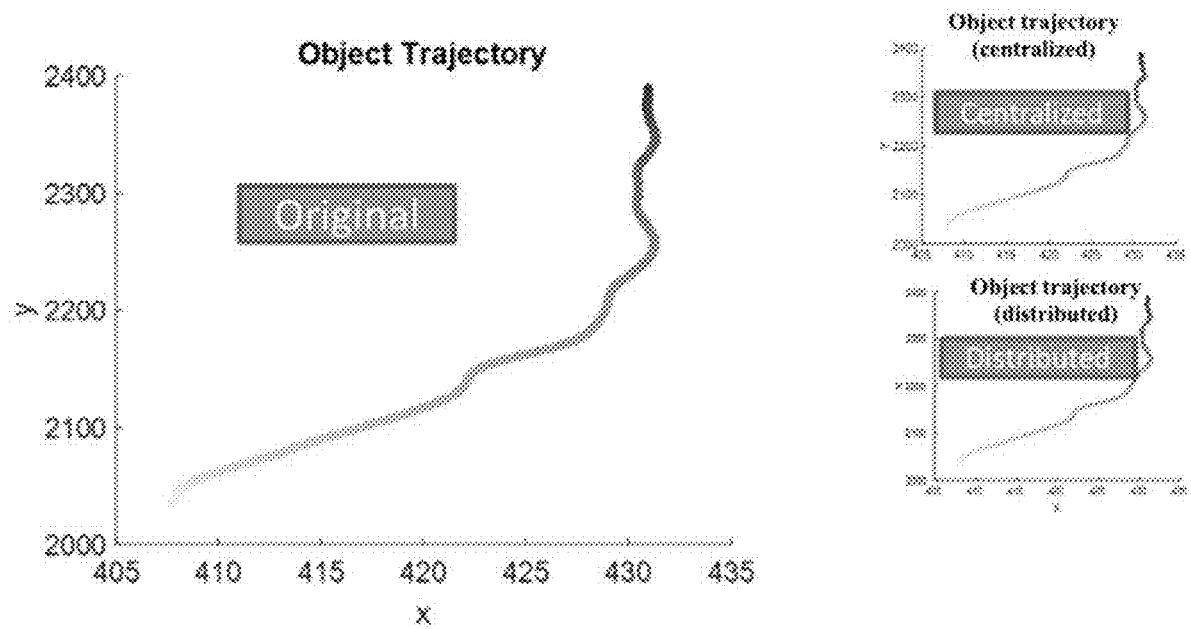
FIG. 16 depicts joint manifold learning (JML) based data fusion approach analysis according to various disclosed embodiments of the present disclosure.

The original vehicle trajectory is shown in FIG. 16. FIG. 16 depicts JML based data fusion approach analysis according to various disclosed embodiments of the present disclosure. Two sub-figures on the right-hand side are achieved through the centralized JML and experimental results. Referring to FIG. 16, it can be concluded that the developed distributed algorithm can efficiently detect the vehicle position in real time.

Figure 17:
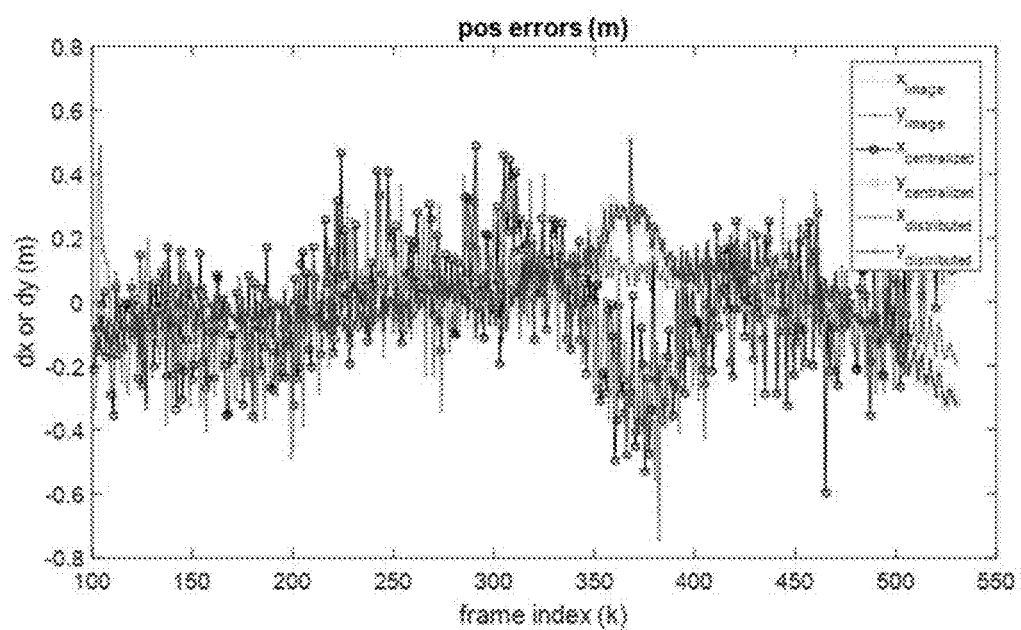
FIG. 17 depicts joint manifold learning (JML) based vehicle position estimation errors according to various disclosed embodiments of the present disclosure.

FIG. 17 depicts JML based vehicle position estimation errors according to various disclosed embodiments of the present disclosure. The experimental results are also compared in FIG. 17, which demonstrates that the centralized and distributed data fusion algorithms can achieve the similar vehicle position estimation performance. The centralized data fusion algorithm outperforms the distributed JML based data fusion by a small amount as during the fusion process, the processing nodes cannot receive the estimation contribution from other nodes for the current time step (with at least 1 step latency). However, the distributed method is more robust and enhances effectiveness without having a single point of failure.

According to various embodiments of the present disclosure, hardware instantiation of the JML-based decentralized data fusion on real hardware with non-permissive communications is described in the present disclosure. A prototype is constructed from drones, onboard processing capabilities cameras, and radars to demonstrate the proposed distributed data fusion algorithm. The results demonstrate the robustness and resiliency of DJML with communication degradation between platforms. The hardware implementation and testing of distributed JML on some practical scenarios, such as detecting/tracking vehicles in a decentralized and on-device fashion, is provided in the present disclosure.

According to various embodiments of the present disclosure, the on-device design and implementation of DJML algorithm for improved object detection, classification, and identification (DCI) is provided in the present disclosure. The DJML design addresses the joint utilization of sensor data from a collection of decentralized, heterogeneous sensing platforms (e.g., sensor swarm) in dynamic environments with constrained communications. The present disclosure focuses on the implementation and evaluation of the hardware tradeoffs for distributed device mechanisms: drone-carried sensing, communication, and computing. Different sensor modality data are preloaded on SD (secure digital) cards and sequentially processed on local device to emulate the additional sensor modalities. The in-lab testing results demonstrate the robustness and resiliency of on-device decentralized DCI under various conditions of sensor placement and communication degradation between platforms.

Various embodiments of the present disclosure further provide a non-transitory computer-readable storage medium, containing program instructions for, when being executed by a processor, performing a method for DJML based heterogeneous sensor data fusion. The method includes obtaining heterogeneous sensor data from the one or more sensors to form a joint manifold; determining one or more optimum manifold learning algorithms by evaluating a plurality of manifold learning algorithms based on the joint manifold; computing a contribution of the node based on the one or more optimum manifold learning algorithms; updating a contribution table based on the contribution of the node and contributions received from one or more neighboring nodes; and broadcasting the updated contribution table to the one or more neighboring nodes.

The embodiments disclosed herein may be exemplary only. Other applications, advantages, alternations, modifications, or equivalents to the disclosed embodiments may be obvious to those skilled in the art and be intended to be encompassed within the scope of the present disclosure.

What is claimed is:

1. A system for distributed joint manifold learning (DJML) based heterogeneous sensor data fusion, comprising:
   a plurality of nodes,
      each node comprising:
         at least one camera;
         one or more sensors;
         at least one memory, configured to store program instructions; and
         at least one processor, coupled with the at least one memory and, when executing the program instructions, configured to:
            obtain heterogeneous sensor data from two or more sensors among the plurality of nodes to form a joint manifold;
            determine one or more optimum manifold learning algorithms by evaluating a plurality of manifold learning algorithms based on the joint manifold;
            compute a contribution of the node based on the one or more optimum manifold learning algorithms;

update a contribution table based on the contribution of the node and contributions received from one or more neighboring nodes among the plurality of nodes; and
broadcast the updated contribution table that includes contributions of the node and the one or more neighboring nodes, to the one or more neighboring nodes, wherein:
the one or more optimum manifold learning algorithms is determined by:
performing the plurality of manifold learning algorithms to process the joint manifold to generate raw manifold learning results;
processing the raw manifold learning results to generate intrinsic parameters; and
determining the one or more optimum manifold learning algorithms by evaluating the plurality of manifold learning algorithms based on the raw manifold learning results and the intrinsic parameters, wherein evaluating the plurality of manifold learning algorithms further includes:
selecting a subset of the plurality of manifold learning algorithms as one or more candidate manifold learning algorithms by evaluating the raw manifold learning results; and
selecting the one or more optimum manifold learning algorithms from the one or more candidate manifold learning algorithms by evaluating the intrinsic parameters.

2. The system according to claim 1, further comprising: a ground station, wherein a node of the plurality of nodes includes an unmanned aerial vehicle (UAV).

3. The system according to claim 1, wherein:
the at least one camera includes one or more infrared (IR) cameras; and
the one or more sensors include one or more of an image sensor, an IR sensor, and a radio frequency sensor.

4. The system according to claim 3, wherein:
the image sensor is configured to process local camera information of the node to estimate state information of the node.

5. The system according to claim 1, wherein:
a pre-defined synchronization time is transmitted to the plurality of nodes.

6. The system according to claim 1, wherein the one or more optimum manifold learning algorithms is determined by:
performing the plurality of manifold learning algorithms to process the joint manifold to generate raw manifold learning results;
processing the raw manifold learning results to generate intrinsic parameters; and
determining the one or more optimum manifold learning algorithms by evaluating the plurality of manifold learning algorithms based on the raw manifold learning results and the intrinsic parameters.

7. A method for distributed joint manifold learning (DJML) based heterogeneous sensor data fusion, performed by each node of a plurality of nodes in a system, each node comprising at least one camera, one or more sensors, and at least one processor configured to performing:
obtaining heterogeneous sensor data from two or more sensors among the plurality of nodes to form a joint manifold;
determining one or more optimum manifold learning algorithms by evaluating a plurality of manifold learning algorithms based on the joint manifold;
computing a contribution of the node based on the one or more optimum manifold learning algorithms;
updating a contribution table based on the contribution of the node and contributions received from one or more neighboring nodes among the plurality of nodes; and
broadcasting the updated contribution table that includes contributions of the node and the one or more neighboring nodes, to the one or more neighboring nodes, wherein:
the one or more optimum manifold learning algorithms is determined by:
performing the plurality of manifold learning algorithms to process the joint manifold to generate raw manifold learning results;
processing the raw manifold learning results to generate intrinsic parameters; and
determining the one or more optimum manifold learning algorithms by evaluating the plurality of manifold learning algorithms based on the raw manifold learning results and the intrinsic parameters, wherein evaluating the plurality of manifold learning algorithms further includes:
selecting a subset of the plurality of manifold learning algorithms as one or more candidate manifold learning algorithms by evaluating the raw manifold learning results; and
selecting the one or more optimum manifold learning algorithms from the one or more candidate manifold learning algorithms by evaluating the intrinsic parameters.

8. The method according to claim 7, wherein: the system further includes a ground station, wherein a node of the plurality of nodes includes an unmanned aerial vehicle (UAV).

9. The method according to claim 7, wherein:
the at least one camera includes one or more infrared (IR) cameras; and
the one or more sensors include one or more of an image sensor, an IR sensor, and a radio frequency sensor.

10. The method according to claim 9, wherein:
the image sensor is configured to process local camera information of the node to estimate state information of the node.

11. The method according to claim 7, wherein:
a pre-defined synchronization time is transmitted to the plurality of nodes.

12. The method according to claim 7, wherein the one or more optimum manifold learning algorithms is determined by:
performing the plurality of manifold learning algorithms to process the joint manifold to generate raw manifold learning results;
processing the raw manifold learning results to generate intrinsic parameters; and
determining the one or more optimum manifold learning algorithms by evaluating the plurality of manifold learning algorithms based on the raw manifold learning results and the intrinsic parameters.

13. A non-transitory computer-readable storage medium, containing program instructions for, when being executed by a processor of each node of a plurality of nodes in a system, performing a method for distributed joint manifold learning (DJML) based heterogeneous sensor data fusion, and the method comprising:
obtaining heterogeneous sensor data from two or more sensors among the plurality of nodes to form a joint manifold;

determining one or more optimum manifold learning algorithms by evaluating a plurality of manifold learning algorithms based on the joint manifold;

computing a contribution of the node based on the one or more optimum manifold learning algorithms;

updating a contribution table based on the contribution of the node and contributions received from one or more neighboring nodes among the plurality of nodes; and broadcasting the updated contribution table to the one or more neighboring nodes, wherein:

the one or more optimum manifold learning algorithms is determined by:

performing the plurality of manifold learning algorithms to process the joint manifold to generate raw manifold learning results;

processing the raw manifold learning results to generate intrinsic parameters; and determining the one or more optimum manifold learning algorithms by evaluating the plurality of manifold learning algorithms based on the raw manifold learning results and the intrinsic parameters, wherein evaluating the plurality of manifold learning algorithms further includes:

selecting a subset of the plurality of manifold learning algorithms as one or more candidate manifold learning algorithms by evaluating the raw manifold learning results; and selecting the one or more optimum manifold learning algorithms from the one or more candidate manifold learning algorithms by evaluating the intrinsic parameters.

14. The storage medium according to claim 13, wherein: the system further includes a ground station, wherein a node of the plurality of nodes includes an unmanned aerial vehicle (UAV).

15. The storage medium according to claim 13, wherein:
the node includes at least one camera and two or more sensors;
the at least one camera includes one or more infrared (IR) cameras; and
the one or more sensors include one or more of an image sensor, an IR sensor, and a radio frequency sensor.

16. The storage medium according to claim 15, wherein:
the image sensor is configured to process local camera information of the node to estimate state information of the node.

17. The storage medium according to claim 13, wherein:
a pre-defined synchronization time is transmitted to the plurality of nodes.

18. The system according to claim 1, wherein performing the plurality of manifold learning algorithms to process the joint manifold includes:
generating, for each of the plurality of manifold learning algorithms, a dimensionality reduction matrix to reduce a dimension of the joint manifold.

19. The system according to claim 1, wherein processing the raw manifold learning results includes:
performing a line regression to the raw manifold learning results for each of the plurality of manifold learning algorithms.

20. The method of claim 19, wherein performing the line regression includes:
generating, for each of the plurality of manifold learning algorithms, a rotating and zooming matrix, and a shifting matrix to lineally transform the raw manifold learning results to obtain the intrinsic parameters.

* * * * *